(12) United States Patent
Hermansky

(10) Patent No.: US 7,192,472 B2
(45) Date of Patent: Mar. 20, 2007

(54) INKJET INK COMPOSITION

(75) Inventor: Clarence Gaetano Hermansky, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/939,664

(22) Filed: Sep. 13, 2004

(65) Prior Publication Data

US 2005/0155516 A1    Jul. 21, 2005

Related U.S. Application Data

(60) Provisional application No. 60/515,570, filed on Oct. 29, 2003, provisional application No. 60/504,013, filed on Sep. 18, 2003.

(51) Int. Cl.
*C09D 11/02* (2006.01)
*B41J 2/01* (2006.01)

(52) U.S. Cl. .................. 106/31.25; 106/31.43; 106/31.58; 106/31.75; 106/31.86; 347/100

(58) Field of Classification Search ............. 106/31.25, 106/31.58, 31.86, 31.43, 31.75; 347/100
See application file for complete search history.

(56) References Cited

U.S. PATENT DOCUMENTS

| | | | |
|---|---|---|---|
| 4,783,220 A | 11/1988 | Gamble et al. | |
| 5,116,409 A | 5/1992 | Moffatt | |
| 5,508,698 A | 4/1996 | Hoekman | |
| 5,554,739 A | 9/1996 | Belmont | |
| 5,565,022 A | 10/1996 | Wickramanayake | |
| 5,571,311 A | 11/1996 | Belmont et al. | |
| 5,609,671 A | 3/1997 | Nagasawa | |
| 5,672,198 A | 9/1997 | Belmont | |
| 5,698,016 A | 12/1997 | Adams et al. | |
| 5,707,432 A | 1/1998 | Adams et al. | |
| 5,713,989 A * | 2/1998 | Wickramanayake et al. ............ 106/31.6 |
| 5,718,746 A | 2/1998 | Nagasawa et al. | |
| 5,747,562 A | 5/1998 | Mahmud et al. | |
| 5,749,950 A | 5/1998 | Mahmud et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A | 1/1999 | Nagasawa et al. | |
| 5,885,335 A | 3/1999 | Adams et al. | |
| 5,891,232 A * | 4/1999 | Moffatt et al. ............ 106/31.89 |
| 5,895,522 A | 4/1999 | Belmont et al. | |
| 5,922,118 A | 7/1999 | Johnson et al. | |
| 5,928,419 A | 7/1999 | Uemura et al. | |
| 5,976,233 A | 11/1999 | Osumi et al. | |
| 6,019,827 A * | 2/2000 | Wickramanayake et al. ............ 106/31.25 |
| 6,057,384 A | 5/2000 | Nguyen et al. | |
| 6,099,632 A | 8/2000 | Nagasawa et al. | |
| 6,123,759 A | 9/2000 | Mise et al. | |
| 6,153,001 A | 11/2000 | Suzuki et al. | |
| 6,177,183 B1 | 1/2001 | Hekal | |
| 6,221,141 B1 | 4/2001 | Takada et al. | |
| 6,221,142 B1 | 4/2001 | Wang et al. | |
| 6,251,350 B1 | 6/2001 | Applegate et al. | |
| 6,261,350 B1 * | 7/2001 | Kabalnov ............ 106/31.33 |
| 6,277,184 B1 | 8/2001 | Kato | |
| 6,281,267 B2 | 8/2001 | Parazak | |
| 6,329,446 B1 | 12/2001 | Sacripante | |
| 6,332,919 B2 | 12/2001 | Osumi et al. | |
| 6,354,693 B1 * | 3/2002 | Looman et al. ............ 347/43 |
| 6,375,317 B1 | 4/2002 | Osumi et al. | |
| 2001/0035110 A1 | 11/2001 | Kato | |
| 2005/0209366 A1 * | 9/2005 | Hermansky ............ 523/160 |

FOREIGN PATENT DOCUMENTS

| | | |
|---|---|---|
| EP | 0 763 577 | 3/1997 |
| EP | 0 839 882 | 6/1998 |
| EP | 0 867 485 | 9/1998 |
| EP | 1 086 997 | 3/2001 |
| EP | 1 114 851 | 7/2001 |
| EP | 1 122 286 | 8/2001 |
| EP | 1 158 030 | 11/2001 |
| EP | 1 167 471 | 1/2002 |
| WO | WO 01/10963 | 2/2001 |
| WO | WO 01/25340 | 4/2001 |
| WO | WO 01 94476 | 12/2001 |

OTHER PUBLICATIONS

The International Search Report (PCT/US2004/030252) dated Dec. 15, 2004.

* cited by examiner

*Primary Examiner*—Helene Klemanski
(74) *Attorney, Agent, or Firm*—Steven C Benjamin; Bart E. Lerman

(57) ABSTRACT

The instant invention pertains to an inkjet ink composition comprising a soluble colorant and a vehicle, wherein the vehicle comprises an aqueous continuous phase and a microemulsified oil phase. The invention also pertains to an ink set containing this inkjet ink, as well as methods of printing using the inkjet ink and/or ink set.

16 Claims, No Drawings

INKJET INK COMPOSITION

CROSS-REFERENCE TO RELATED APPLICATIONS

This application claims priority under 35 U.S.C. §119 from U.S. Provisional Application Ser. No. 60/504,013 (filed Sep. 18, 2003), and from U.S. Provisional Application Ser. No. 60/515,570 (filed Oct. 29, 2003), the disclosures of which are incorporated by reference herein for all purposes as if fully set forth.

BACKGROUND OF THE INVENTION

The instant invention pertains to an inkjet ink composition. More particularly, the invention pertains to an inkjet ink comprising a soluble colorant and a vehicle, wherein the vehicle is comprised of an aqueous continuous phase and a "microemulsified" oil phase.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Both dyes and pigments have been used as colorants for inkjet inks. Pigments can provide excellent durability with regard to fade resistance (light fastness) and good chroma when formulated properly. Dyes provide good chroma and are considered easier to formulate, but are less lightfast.

Dye-based inks may suffer from other deficiencies, for example, images printed with dye inks tend to lack water fastness, and suffer from bleed and feathering. Solutions to these problems often cause other problems, for example, applying a fixer to increase water fastness tends to reduce chroma.

The background of U.S. Pat. No. 6,261,350 provides a good discussion of dye ink formulation and problems. Art related to improved dye formulations includes the following references.

U.S. Pat. No. 4,783,220 pertains to ink comprising oil-soluble dye in association with surfactant vesicles. Disclosed is an oil-soluble dye associated with (cationic) dioctadecyldimethyl ammonium bromide vesicles.

U.S. Pat. No. 5,116,409 pertains to aqueous inks comprising water-soluble anionic dyes and certain surfactants. Disclosed is an aqueous ink with an anionic dye and cetyl trimethylammonium bromide (CTAB) as surfactant.

U.S. Pat. No. 5,565,022 pertains to an aqueous ink comprising water, dye, oil and an amphiphile to solublized the oil. Disclosed is a composition comprising water, an anionic water soluble dye, ethylene glycol phenyl ether (oil) and sodium xylene sulfonate amphihile.

All of the disclosures of the above-identified publications are incorporated by reference herein for all purposes as if fully set forth.

There is still a need for increased chroma and improved edge acuity and water fastness in dye-based inkjet inks.

SUMMARY OF THE INVENTION

The present invention is directed to inkjet ink compositions comprising a vehicle and at least one soluble, ionizable colorant. The vehicle is comprised of an aqueous phase and a water-insoluble oil phase wherein the oil phase is emulsified in the aqueous (continuous) phase to form an isotropic liquid. The oil phase is stabilized to emulsion by one or more emulsifiers; at least one of the emulsifiers is ionizable. The charge on the ionizable colorant and the ionizable emulsifier are opposite. In other words, when the ionizable colorant is anionic, the ionizable emulsifier is cationic; and when ionizable colorant is cationic, the ionizable emulsifier is anionic.

Accordingly, there is provided an inkjet ink composition comprising:

(1) a vehicle comprising:
   (a) an aqueous continuous phase,
   (b) an oil phase emulsified in said aqueous continuous phase, and
   (c) an ionic groups-containing emulsifier to stabilize the emulsion of said oil phase in said aqueous phase, said ionic groups of said emulsifier having a first charge; and (2) a colorant soluble in said aqueous continuous phase and having, in solution, a second charge such that said second charge is opposite in sign to said first charge.

The inkjet ink may as well contain combinations of "ionic" emulsifiers and/or colorants. In addition, the inkjet ink may optionally contain other types of emulsifiers ("co-emulsifier") to assist in stabilization of the oil phase in the aqueous continuous phase.

Preferably, the colorant is soluble in the aqueous phase and substantially insoluble in the oil phase.

In accordance with another aspect of the present invention, there is provided an ink set comprising an inkjet ink as set forth above and a fixer for such inkjet ink. Preferably, the fixer comprises an aqueous vehicle and a charge bearing fixing agent, wherein the charge of the fixing agent is opposite in sign to the charge of the emulsifier in the inkjet ink.

In accordance with another aspect of the present invention, there is provided an ink set comprising at least three differently colored inks, wherein at least one of the inks is an inkjet ink as set forth above. The ink set may also comprise a fixer for one or more of the inks in the ink set and, more preferably, a fixer comprising an aqueous vehicle and a charge bearing fixing agent, wherein the charge of the fixing agent is opposite in sign to the charge of the emulsifier in the inkjet ink (described above) being fixed.

In yet another aspect of the present invention, there is provided a method for ink jet printing onto a substrate, comprising the steps of:

(a) providing an ink jet printer that is responsive to digital data signals;

(b) loading the printer with a substrate to be printed;

(c) loading the printer with an ink as set forth above and described in further detail below, or an ink jet ink set as set forth above and described in further detail below; and (d) printing onto the substrate using the ink or inkjet ink set in response to the digital data signals.

Preferred substrates include plain paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The instant inks comprise a colorant and a vehicle. The vehicle is an isotropic liquid mixture of an aqueous phase and an oil phase. It is believed the mixture is in the form of a microemulsion, and will be referred to as such, but the precise structure of the vehicle is not limiting so long as it is an isotropic mixture. There are one or more emulsifiers to stabilize the oil phase as a microemulsion. Stabilization of the microemulsion can be assisted with one or more optional co-emulsifiers. The colorant, a dye, is soluble in the aqueous phase of the vehicle; it is, typically, substantially insoluble in the oil phase.

The inks can also contain other ingredients as are well known in the art. Adaptation of the ink formulation to a particular inkjet printer may be needed to provide an appropriate balance of properties such as, for instance, viscosity and surface tension.

The inkjet inks formulated in accordance with the invention exhibit one or more of, or a better combination of, reduced bleed and improved chroma and water fastness.

Colorant

The colorant (dye) is soluble in the aqueous phase and is ionizable. Ionizable dyes are those dyes that, in aqueous solution, yield colored ions: anionic dyes yield colored anions and cationic dyes yield colored cations. Such dyes are well known to those of ordinary skill in the art.

Anionic dyes typically contain carboxylic and/or sulfonic acid groups as the ionic moiety. The types of anionic dyes most useful in this invention are, for example, Acid, Direct, Food, Mordant and reactive dyes.

Anionic dyes are preferably selected from the group consisting of nitroso compounds, nitro compounds, azo compounds, stilbene compounds, triarylmethane compounds, xanthene compounds, quinoline compounds, thiazole compounds, aminoketone compounds, anthraquinone compounds, indigoid compounds, phthalocyanine compounds and mixtures thereof. Preferred anionic dyes that may suitably be employed in the practice of the invention include, but are not limited to: C. I. Acid Blue 9, C. I. Acid Blue 40, C. I. Acid Red 18, C. I. Acid Red 52, C. I. Acid Yellow 23, C. I. Direct Blue 199, C. I. Mordant Violet 5, C. I. Mordant Violet 39, and their counterions include, e.g., $Na^+$, $Li^+$, $Cs^+$, $NH_4^+$ and substituted ammonium salts.

Preferred types of cationic dyes include mainly the basic dyes and some of the mordant dyes that are designed to bind to acidic sites on a substrate, such as fibers. Preferred types of such dyes include the azo compounds, diphenylmethane compounds, triarylmethanes, xanthene compounds, acridiline compounds, quinoline compounds, methine or polymethine compounds, thiazole compounds, indamine or indophenyl compounds, azine compounds, oxazine compounds and thiazine compounds, among others, and mixtures thereof, all of which are known in the art.

Preferred cationic dyes that may suitably be employed in the practice of this invention include, but are not limited to: C. I. Basic Blue 3, C. I. Basic Blue 9, C. I. Basic Red 1, C. I. Basic Red 3, C. I. Basic Violet 7, C. I. Basic 10, C. I. Basic Violet 16, C. I. Basic Violet 23, C. I. Basic Yellow 9, C. I. Basic 11, C. I. Mordant Blue 14 and C. I. Mordant Green 13, and their counterions include, e.g., $Cl^-$, $Br^-$, $ZnCl_4^-$ and $NO_3^-$.

The color and amount of ionic dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The ionizable dye is typically present in the amount of about 0.01% to about 12% by weight, preferably about 0.05% to about 10% by weight, and more preferably about 1% to about 8% by weight, based on the total weight of the ink.

Aqueous Phase

"Aqueous phase" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous phase typically will contain about 30% to about 95% water with the balance (i.e., about 70% to about 5%) being the water-soluble solvent. Preferred compositions contain about 60% to about 95% water, based on the total weight of the aqueous phase. The amount of aqueous phase in the ink is typically in the range of about 50% to about 98%, based on total weight of the ink.

The vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

Oil Phase

The "oil phase" refers to a water-insoluble organic solvent. Examples of water-insoluble organic compounds ("oils") include, but are not limited to, water-insoluble members of the following classes of materials: ethyleneoxy- and propyleneoxy-oils; mono- or polyglycol ethers; alcohols; polyols; water-insoluble mono- or polyglycol esters; terpenes; phenols; aldehydes; ketones; hydrocarbons; polyether modified polysiloxanes; and mixtures thereof. In general, any water-insoluble organic compound, or combination thereof, may be employed in the practice of the invention, as long as it is compatible with the other components in the inkjet ink composition. Preferred oils include mono- and diethylene glycol phenyl ether; and mono- and dipropylene glycol phenyl ether.

Selecting oils with a vapor pressure less than that of water can be advantageous in retarding evaporation of the ink and preventing pluggage of the inkjet nozzles. Also, incorporating oil in the ink vehicle reduces paper cockle compared to an entirely aqueous vehicle.

The oil content is varied as needed but is typically in the range of from about 1% to about 40%, and more typically from about 2 to about 20%, by weight based on the total weight of ink.

Emulsifier

Emulsifiers are surfactants, but the use of the term "emulsifier" herein will be restricted to mean surfactants specifically employed to effect the microemulsification of the oil. Like any surfactant, emulsifiers consist of a water-soluble (hydrophilic) segment and an oil-soluble (lipophilic) segment. The hydrophilic segment, in general, can be non-ionic or ionic (ionizable). As prescribed by the present invention, there is at least one ionizable emulsifier present in the formulation, although there can be more than one emulsifier and the additional emulsifier(s) can include one or more non-ionic emulsifiers.

Ionizable groups in the hydrophilic segment yielding anions (anionic emulsifiers) include: carboxylate, sulfate, sulfonate, and phosphate and phosphonates. Examples of anionic surfactants include, but are not limited to: alkylbenzene sulfonates, alkyl sulfonate, alkylsulfate, sulfosuccinates, alcohol ethoxylate sulfate, alcohol ethoxylate sulfonate, alkyl phosphate, alkylethoxylated phosphate, ethoxylated alkylphenol sulfate, fatty carboxylate, taurate, isethionate, aliphatic carboxylate, or those derived from a polymer containing an acid group. Preferred examples include sodium dodecylbenzene sulfonate, sodium dodecylsulfate, and block copolymers of (meth)acrylic acid and their salts.

Ionizable groups in the hydrophilic segment yielding cations (cationic emulsifiers) include ammonium and quaternary ammonium. Ammonium derivatives include the protonated form of fatty amines, esters of an aminoalcohol, alkylamines, polymers containing an amine functionality, aniline and its derivatives, fatty alcohol esters of amino acids, polyamine N-alkylated with a dialkyl succinate ester, heterocyclic amines, quanidine derivative of fatty amines, guanidine derivative of alkylamines, guanidine derivatives of arylamines, amidine derivatives of fatty amines, amidine derivative of fatty acids, amidine derivatives of alkylamines, or amidine derivatives of arylamines. Quaternary ammonium derivatives include but are not limited to fatty alkyl trimethyl ammonium, and alkyl trimethyl ammonium or 1-alkylpyridinium salts, where the counter ion is halide, sulfonate, sulfate or the like. A preferred class of quaternary emusifier is represented by the following structure:

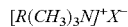

wherein R is a $C_{6-C30}$ alkyl, and X is an anionic counterion such as halide, sulfonate, sulfate and the like.

A particularly preferred example is the quaternary cationic emulsifier cetyltrimethyl ammonium bromide.

The selection of a particular emulsifier, and the level employed, depends on the oil, as is in general well known. Typically, emulsifier levels are from about 1% to about 20% by weight based on the total weight of the ink composition.

Co-Emulsifier

Microemulsions are often more effectively stabilized with the aid of what is commonly referred to as a "co-surfactant". For consistency with the terminology used herein, these species will be referred to as "co-emulsifiers".

Co-emulsifiers are typically ($C_{3-C8}$) alcohols, especially linear alcohols. Particularly preferred are n-butanol, n-pentanol, n-hexanol and 2-pentanol. When present, co-emulsifiers comprise about 0.1% to about 20%, preferably about 0.1% to about 15%, and more preferably from about 0.1% to about 10%, by weight based of the total weight of the ink composition.

A molar ratio of surfactant (emulsifier) to co-surfactant (co-emulsifier) of about 1:8 or less, and preferably about 1:5, is preferred from the standpoint of providing a phase map with the largest microemulsion region.

Other Ingredients

Consistent with the requirements for the inks of this invention, various types of additives may be employed in the ink to optimize the properties of the ink composition for specific applications. For example, as is well known to those skilled in the art, one of more biocides, fungicides, and/or microbial agents may be used. Examples of suitable employed microbial agents include, but are not limited to, Nuosept® (Nudex, Inc.), Ucarcide® (Union Carbide), Vancide® (R. T. Vanderbilt Co.), and Proxel® (ICI America). Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

Surfactants other than emulsifiers can be used. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

Humectants can be used such as ethanediol; propanediols (1,2-propanediol, 1,3-propanediol, 2-ethyl-2-(hydroxymethyl)-1,3-propanediol, ethylhydroxypropanediol (EHPD)); butanetriols (e.g., 1,2,4-butanetriol), pentanetriols (e.g., 3-methyl-1,3,5 pentanetriol); glycerol and mixtures thereof.

Other common inkjet co-solvents can be used, such as 2-pyrrolidone, bishydroxyethylsulfone, and thiodiglycol.

Ink Preparation

The ink compositions of the present invention will generally be prepared by adding colorant to a preformed vehicle microemulsion. The microemulsion vehicle will have been optimized separately, prior to making the final ink.

Techniques for scouting microemulsions are known. For example, the oil, co-emulsifier and water can be combined in a ratio that reflects the final desired inkjet ink composition. This two-phase mixture can then be titrated with the emulsifier until a single-phase is obtained. When optimized, the dye, and any desired additives, can be added to this single-phase vehicle to complete the formulation of the ink.

Often, a more systematic approach to preparing microemulsions is desired. In that case, a ternary phase map can be constructed by fixing the ratio of any two components. For example, the ratio of the emulsifier to co-emulsifier (E/C) can be fixed, leaving the three apices ("corners") of the phase map to represent oil, water and E/C. For each E/C ratio, a phase map is constructed by titrating various proportions of oil and E/C mixture with water, noting the visual characteristics of the mixture corresponding to each water addition. Depending on the composition, multi-phase, semi-solid, and clear, single-phase regions will be found. When plotted on a conventional phase diagram, single-phase regions suitable for use in an inkjet ink can be identified.

The addition of the ionic dye to a preformed microemulsion vehicle may cause destabilization (phase separation) of the microemulsion. In most cases, adding more emulsifier will offset the destabilization, reforming the microemulsion.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inventive inks can be less than about 7 cps, or less than about 5 cps, and even less than about 3.5 cps.

Ink Sets

In accordance with another aspect of the present invention, there is provided an ink set comprising an inkjet ink as described above and a fixer for such inkjet ink. The fixer is described in more detail below. This ink set more preferably comprises at least three differently colored inks, wherein at least one of the inks is an ink as described above.

In accordance with the instant invention, there is also provided an ink set comprising at least three differently colored aqueous inks, wherein at least one of the inks is an ink as described above. The other inks of the ink set are preferably also aqueous inks, and may contain dyes, pigments or combinations thereof as the colorant. Such other aqueous inks are based on aqueous vehicles and other components and additives as described above or as otherwise known to those of ordinary skill in the art and may, in a general sense, be considered known to those of ordinary skill in the art.

The ink sets more preferably comprise at least three primary inks: at least one cyan ink, at least one magenta ink and at least one yellow ink. Each of these primary inks is in turn comprised of a vehicle and an appropriate colorant dispersed (pigment) and/or dissolved (dye) in the vehicle, with at least one of the inks being an ink as described above.

The ink set may optionally include a black ink, preferably comprising carbon black pigment. When present, the carbon black pigment is preferably a "self-dispersing" carbon black such as those disclosed, for example, in U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, U.S. 2001/0035110, EP-A-1086997, EP-A-1114851, EP-A-1158030, EP-A-1167471, EP-A-1122286, WO01/10963, WO01/25340 and WO01/94476 (the disclosures of which are incorporated by reference herein for all purposes as if fully set forth).

The black colorant may also be dye as, for example, the black dye disclosed in U.S. Pat. No. 5,753,016. The black colorant may also be a combination of dye and pigment as, for example, disclosed in U.S. Pat. No. 6,277,184. The disclosures of both of the preceding references are incorporated by reference herein for all purposes as if fully set forth.

Any of these ink sets can further include a fixer.

Fixer

A fixer (fixing fluid) comprises a fixing agent and aqueous vehicle, and is preferably substantially colorless. It is jetted under and/or over a colored ink to improve the image properties (e.g. water fastness, chroma) without visibly changing the color. The fixing agent is a charged species of opposite sign to the ionic emulsifier of the microemulsion, and is soluble or dispersible in the fixer vehicle. Fixing agents include charge bearing organic, inorganic or polymeric compounds, especially ionizable soluble polymers, surfactants, polymer latexes (dispersed polymers) and low molecular weight organic molecules (mono- and multi-functional).

Anionic fixing agents include organic and inorganic acids and salts thereof; anionic surfactants such as alkyl-benzene sulfonates, alkyl sulfonates, alkylsulfates, sulfosuccinates, alcohol ethoxylate sulfates, alcohol ethoxylates sulfonates, alkyl phosphates, etc; anionic polyelectrolytes, such as soluble or dispersible random or block copolymers of acrylic acid or methacrylic acid, styrene, and acrylate ethers, such as methyl acrylate, butyl acrylate, hexyl acrylate, methyl methacrylate, butyl methacrylate, and hydrolyzed copolymers of styrene and maleic acid anhydride.

Cationic fixing agents include organic and inorganic bases; cationic surfactants such as quaternized ammonium or pyridinium surfactants, for example dodecyltrimethylammnium chloride, cetyltrimethylammonium bromide, cetyltrimethylpyridinium chloride, and the like; cationic polyelectrolytes such as soluble or dispersible, random or block copolymers of, for example, polyethyleneimine, polyallylamine, polyvinylpyrrolidone, and the like, protonated by an acid to the salt form.

An aqueous vehicle for the fixer can be the same as the "aqueous phase" prefiously described for the colored microemulsion. Selection of a suitable mixture depends on requirements of the specific application, such as desired surface tension and viscosity, the selected fixer, drying time of the fixer fluid, and the type of substrate onto which an aqueous fixer fluid will be printed. The aqueous vehicle will typically contain about 30% to about 95% water with the balance being the water-soluble solvent. Preferred compositions contain about 60% to about 95% water, based on the total weight of the aqueous vehicle.

Other ingredients that are generally well known in the art may be formulated into the fixer fluid, to the extent that such other ingredients do not destabilize the fixer fluid or interfere with its performance.

EXAMPLES

A series of inventive and comparative inks were prepared and tested. The compositions, as a weight percent in the final ink, are given in the table below along with the print properties. In preparing the inks, the vehicle components were mixed together first, then the dye was added to the vehicle.

All of the inks were applied, by draw-down, to Boise X-9000 plain paper. The sheets were allowed to dry for 30 minutes at ambient temperature prior to further testing. Chroma (C*) measured using a Minolta CM-3600 spectrophotometer (Minoltoa Corp., USA).

Water fastness was evaluated by running a thin stream of water (about 2 mL) over the imaged area. The prints were visually rated for color loss/migration. A rating of "poor" indicated significant migration of color; a rating of "good" indicated only slight migration of color. The chroma of the wetted area was measured and reported as percent loss relative to the original chroma value (larger % loss indicated more color was removed, and less water fastness).

| Ingredients | Ink A | Ink B | Ink C | Ink 1 | Ink 2 |
| --- | --- | --- | --- | --- | --- |
| Colorant | | | | | |
| Acid Blue 9 | 1.65 | 1.65 | 3.00 | 1.65 | 2.78 |
| Vehicle | | | | | |
| Cetyltrimethly ammonium bromide (CTAB) | 2.00 | 2.00 | | 14.70 | 13.89 |
| Sodium xylene sulfonate (SXS) | | | 11.00 | | |
| n-Butanol | | | | 14.70 | 9.26 |
| Diethylene glycol | | 6.00 | | | |
| Dowanol ® PPH | | | 25.00 | 3.30 | 4.63 |
| Water | 96.35 | 90.35 | 61.00 | 65.65 | 69.40 |
| Print Properties | | | | | |
| Chroma (C*) | 41.6 | 41.2 | 45.7 | 45.8 | 47.1 |
| Water fastness - Visual | poor | poor | poor | good | good |
| % reduction in C* after water treatment | 5.0 | 14.3 | 16.2 | 2.6 | 1.9 |

Comparative Inks A and B correspond to micellar solutions (no oil phase) and were derived from compositions disclosed in Table 1 of previously incorporated U.S. Pat. No. 5,116,409. Comparative Ink C, derived from Example 2 of previously incorporated U.S. Pat. No. 5,565,022, corresponds to a microemulsion vehicle with ionic emulsifier where the charge of the emulsifier and colorant is the same (both are anionic).

Comparing inventive Ink 1 to comparative Inks A and B, and inventive Ink 2 to comparative Ink C, it is seen that the inventive inks provide higher chroma and better water fastness.

Additional inks were prepared according to the following formulations. All values are in weight percent of the final ink weight.

| Ingredients | Ink D | Ink 3 | Ink 4 | Ink 5 |
| --- | --- | --- | --- | --- |
| Acid Blue 9 | 2 | 2 | | |
| Acid Red 52 | | | 2 | |
| Acid Yellow 23 | | | | 2 |
| Vehicle A* | 98 | | | |
| Vehicle B** | | 98 | 98 | 98 |

*Vehicle A (aqueous) is, as a percent by weight, 80.3% water, 8.1% glycerol, 6.0% 2-pyrilidinone and 5.6% LEG-1.
**Vehicle B (microemulsion) is, as a percent by weight, 75% water, 5% Dowanol PPH (dipropylene glycol monophenyl ether), 10% n-butanol, 10% cetyltrimethyl ammonium bromide Fixer fluid compositions were prepared by mixing ingredients together according to the following recipe.

| Fixer Ingredients | % weight |
| --- | --- |
| Fixing Agent | as indicated |
| Glycerol | 8.1% |
| LEG-1 | 5.6% |
| 2-Pyrrolidone | 6.0% |
| DI water | balance |

The identity of each fixing agent, along with the fixing fluid pH and fixing agent weight percent is given in the following table.

| Fixer | pH | % weight | |
| --- | --- | --- | --- |
| | | | Fixing Agent (Anionic) |
| Fixer 1 | 6–9 | 15.7 | Acrylic latex with carboxylate internal stabilizer |
| Fixer 2 | 7 | 15.0 | Polymethacrylic acid, degree of polymerization = 10 |
| Fixer 3 | 8.6 | 7.5 | Primacor ® 5990 (Dow), ethylene acrylic acid copolymer. |
| Fixer 4 | 7.3 | 2.8 | Aerosol ® OT (dialkysulfosuccinate surfactant, Cytec Industries) |
| Fixer 5 | 7.0 | 15.0 | Latex CP 615NA (Dow) carboxylated styrene/butadiene polymer |
| Fixer 6 | — | 15.0 | Sodium polyphosphate |
| Fixer 7 | 7.0 | 15.0 | Phthalic acid |
| Fixer 8 | 7.0 | 15.0 | 1,2,3,4,5,6-Cyclohexanehexacarboxylic acid |
| Fixer 9 | 7.0 | 55.6 | Dowfax 8390 (Dow), a difunctional sulfonated surfactant. |
| | | | Fixing Agent (Cationic) |
| Fixer 10 | — | 10.0 | Witcobond ® W-213 (Crompton) aqueous cationic polyurethane dispersion. |
| Fixer 11 | — | 10.0 | Poly(diallyl dimethyl ammonium chloride) |
| Fixer 12 | — | 10.0 | Benzylmethacrylate//diaminoethyl methacrylate 10/15, 90% quaternarized with Benzyl Chloride. |

A 1×3 inch block of each of Fixers 1 through 9 was printed using the black pen position of an Epson 3000 printer. Printing was done on Boise X-9000 plain paper, at 25, 50, 75 and 100% coverage, and 720 dpi resolution. Within 3–5 seconds, each print was again fed to the Epson 3000 and a 1×6 inch color block of Ink 3 printed. This color block covered the fixer block and extended an additional 1×3 inches onto an untreated portion of the paper (reference block). The rectangular patterns were created in CorelDraw (Corel Corporation).

Chroma measurements were made on the "fixed" and "un-fixed" blocks using a Minolta CM-3600 spectrophotometer (Minoltoa Corp., USA). The results are given in the following table.

| % Coverage | Chroma Values | | | | | | | | |
| --- | --- | --- | --- | --- | --- | --- | --- | --- | --- |
| | Fixer 1 | Fixer 2 | Fixer 3 | Fixer 4 | Fixer 5 | Fixer 6 | Fixer 7 | Fixer 8 | Fixer 9 |
| 0 | 45 | 46.3 | 45 | 46.2 | 46.1 | 46.3 | 46.1 | 46.1 | 46.9 |
| 25 | 45.1 | 45.6 | 45.1 | 44.9 | 46 | 46 | 46.1 | 42.6 | 47.3 |
| 50 | 47.2 | 46.9 | 46.4 | 47.5 | 46.9 | 44.4 | 43.9 | 38.5 | 47 |
| 75 | 48.7 | 49.2 | 48.1 | 47.9 | 48.4 | 43.3 | 41.6 | 34.7 | 46.9 |
| 100 | 50.4 | 53.1 | 50.9 | 48.9 | 49.6 | 45.5 | 40.2 | 35.8 | 47.1 |

The data shows Fixers 1–5 and 9 effectively increase chroma. With Fixers 6–8 there is a decrease in chroma.

Water fastness was also assessed for each of the trial blocks above, by visually comparing the color mobility resulting from an exposure of the 1×3 inch color blocks to a ¼ inch stream of water, 2 milliliters total volume. The stream was applied with the print at an angle of about 45 degrees from horizontal, followed by drying under ambient conditions with the print hanging vertically. The evaluations are given in the following table according to the following scale.

| Ink 3 Water Fastness at Fixer Coverage | | | | |
|---|---|---|---|---|
| Fixer | 100% | 75% | 50% | 25% |
| Fixer 1 | E | G | F | F |
| Fixer 2 | G | G | F | F |
| Fixer 3 | E | G | F | F |
| Fixer 4 | E | G | F | F |
| Fixer 5 | E | G | F | F |
| Fixer 6 | E | E | G | F |
| Fixer 7 | P | P | F | F |
| Fixer 8 | P | P | F | F |
| Fixer 9 | P | P | F | F |

E - excellent, slight or no color removal.
G - good, some color removal, but acceptable.
F - fair, noticeable color removal.
P - poor, large amount of color removal.

The water fastness of Ink 3 alone/without underprinted fixer was rated as fair (F). The fixer results show improved water fastness with Fixers 1–6.

Preferably, a fixer will provide improved waterfastness without decreasing chroma. More preferably, the fixer will increased chroma as well as provide water fastness. Thus, for inks with cationic emulsifier, fixing agents such as those in fixers 1–5 are preferred.

Further prints were made, as previously described, and chroma and waterfastness were evaluated. Results are summarized below.

| Chroma of Ink 3 with and without fixer | | | | | | |
|---|---|---|---|---|---|---|
| Fixer | Fixer 1 | Fixer 3 | Fixer 4 | Fixer 10 | Fixer 11 | Fixer 12 |
| No Fixer | 52.6 | 51.8 | 52.3 | 50.6 | 46.9 | 51.3 |
| 100% coverage | 53.1 | 54.1 | 53.5 | 50.0 | 43.6 | 53.2 |

| Water fastness of Ink 3 with and without fixer | | | | | | |
|---|---|---|---|---|---|---|
| Fixer | Fixer 1 | Fixer 3 | Fixer 4 | Fixer 10 | Fixer 11 | Fixer 12 |
| No Fixer | F | F | F | F | F | F |
| 100% coverage | E | E | E | F | P | P |

| Chroma of Ink 4 with and without fixer | | | |
|---|---|---|---|
| Fixer | Fixer 1 | Fixer 3 | Fixer 4 |
| No Fixer | 82.0 | 81.7 | 83.2 |
| 100% coverage | 82.3 | 83.4 | 80.6 |

| Chroma of Ink 5 with and without fixer | | | |
|---|---|---|---|
| Fixer | Fixer 1 | Fixer 3 | Fixer 4 |
| No Fixer | 78.3 | 76.0 | 78.7 |
| 100% coverage | 77.9 | 78.7 | 78.4 |

| Water fastness of Ink 4 with and without fixer | | | |
|---|---|---|---|
| Fixer | Fixer 1 | Fixer 3 | Fixer 4 |
| No Fixer | P | P | P |
| 100% coverage | E | G | G |

| Water fastness of Ink 5 with and without fixer | | | |
|---|---|---|---|
| Fixer | Fixer 1 | Fixer 3 | Fixer 4 |
| No Fixer | F | F | F |
| 100% coverage | E | E | E |

Results demonstrate that fixers can increase the chroma and water fastness of the microemulsion inks. Particularly advantageous are fixers with charge bearing fixing agents wherein the charge of the fixer is opposite in sign to the charge of the emulsifier in the ink being fixed.

The invention claimed is:

1. An inkjet ink composition comprising:
    (1) a vehicle comprising:
        (a) an aqueous continuous phase,
        (b) an oil phase emulsified in said aqueous continuous phase, and
        (c) an emulsifier to stabilize the emulsion of said oil phase in said aqueous phase, said emulsifier having a first charge; and
    (2) a dye soluble in said aqueous continuous phase and having, in solution, a second charge such that said second charge is opposite in sign to said first charge.

2. The inkjet ink composition of claim 1, wherein the oil phase comprises an oil selected from the group consisting of ethylene glycol phenyl ether, diethylene glycol phenyl ether, propylene glycol phenyl ether, dipropylene glycol phenyl ether and mixtures thereof.

3. The inkjet ink composition of claim 1, wherein the oil phase is present in a range of about 1% to about 40% by weight based on the total weight of the ink composition.

4. The inkjet ink composition of claim 1, further comprising a co-emulsifier selected from $C_3$–$C_8$ alcohols.

5. The inkjet ink composition of claim 4, wherein the molar ratio of emulsifier to co-emulsifier is in the range of about 1:8.

6. The inkjet ink composition of claim 1, wherein the dye is anionic and the emulsifier is cationic.

7. The inkjet ink composition of claim 1, wherein the emulsifier has the formula $$[R(CH_3)_3N]xX^-$$

wherein R is a $C_6$–$C_{30}$ alkyl, and X is an anionic counterion.

8. An ink set comprising:
A. an inkjet ink composition comprising:
(1) a vehicle comprising:
 (a) an aqueous continuous phase,
 (b) an oil phase emulsified in said aqueous continuous phase, and
 (c) an emulsifier to stabilize the emulsion of said oil phase in said aqueous phase, said emulsifier having a first charge; and
(2) a colorant soluble in said aqueous continuous phase and having, in solution, a second charge such that said second charge is opposite in sign to said first charge; and
B. a fixer for said inkjet ink composition.

9. The ink set of claim 8, wherein the fixer comprises an aqueous vehicle and a charge bearing fixing agent, wherein the charge of the fixing agent Is opposite in sign to the charge of the emulsifier in the inkjet ink composition.

10. The ink set of claim 8, wherein the fixer is substantially colorless.

11. An ink set comprising at least three differently colored inks, wherein at least one of the inks is an inkjet ink composition comprising:
(1) a vehicle comprising:
 (a) an aqueous continuous phase,
 (b) an oil phase emulsified in said aqueous continuous phase, and
 (c) an emulsifier to stabilize the emulsion of said oil phase in said aqueous phase, said emulsifier having a first charge; and
(2) a dye soluble in said aqueous continuous phase and having, in solution, a second charge such that said second charge is opposite in sign to said first charge.

12. The ink set of claim 11, further comprising a fixer for said inkjet ink composition.

13. The ink set of claim 12, wherein the fixer comprises an aqueous vehicle and a charge bearing fixing agent, wherein the charge of the fixing agent is opposite in sign to the charge of the emulsifier in the inkjet ink composition.

14. The ink set of claim 12, wherein the fixer is substantially colorless.

15. The ink set of claim 11, comprising at least one cyan ink, at least one magenta ink and at least one yellow ink, with at Least one of the inks being said inkjet ink composition.

16. A method for ink jet printing onto a substrate, comprising the steps of:
(a) providing an ink jet printer that is responsive to digital data signals;
(b) loading the printer with a substrate to be printed;
(c) loading the printer with an inkjet ink composition comprising:
 (1) a vehicle comprising:
  (i) an aqueous continuous phase,
  (ii) an oil phase emulsified in said aqueous continuous phase, and
  (iii) an emulsifier to stabilize the emulsion of said oil phase In said aqueous phase, said emulsifier having a first charge; and
 (2) a dye soluble in said aqueous continuous phase and having, in solution, a second charge such that said second charge is opposite in sign to said first charge; and
(d) printing onto the substrate using the ink or inkjet ink set in response to the digital data signals.

* * * * *